United States Patent [19]

Yamada et al.

[11] Patent Number: 5,073,823
[45] Date of Patent: Dec. 17, 1991

[54] VIDEO LIGHT APPARATUS TURNED-ON SELECTIVELY IN A STANDBY-MODE OF A VIDEO CAMERA

[75] Inventors: Yukio Yamada, Kanagawa; Akio Furukawa, Saitama; Kazuki Isono, Kanagawa, all of Japan

[73] Assignee: Sony Corporation, Tokyo, Japan

[21] Appl. No.: 583,595

[22] Filed: Sep. 17, 1990

[30] Foreign Application Priority Data

Sep. 20, 1989 [JP] Japan .................................. 1-243670

[51] Int. Cl.⁵ .............................................. H04N 5/30
[52] U.S. Cl. .................................... 358/209; 358/909; 358/906; 358/228; 358/335
[58] Field of Search ................ 358/209, 906, 909, 229, 358/228, 211, 224, 225, 335, 310; 352/198; 362/3, 296

[56] References Cited

U.S. PATENT DOCUMENTS

| | | | |
|---|---|---|---|
| 4,652,916 | 3/1987 | Suzaki | 358/211 |
| 4,682,238 | 7/1987 | Cawthorne | 358/211 |
| 4,823,199 | 4/1989 | Sakakibara | 358/906 |
| 4,862,293 | 8/1989 | Saito | 358/906 |
| 4,881,128 | 11/1989 | Yamada | 358/228 |
| 4,939,597 | 7/1990 | Maeda | 358/906 |

Primary Examiner—Howard W. Britton
Assistant Examiner—Sherrie Hsia
Attorney, Agent, or Firm—Lewis H. Eslinger; Jay H. Maioli

[57] ABSTRACT

A video camera apparatus for use in a video camera or a video tape recorder having a built-in type camera in which a video light apparatus is detachably mounted to the body of the video camera, includes a circuit whereby the video light apparatus is automatically turned ON or OFF when the video camera apparatus is in a standby mode in response to a remote control signal, so that the video camera apparatus is easy to use and the video light apparatus can be operated for a longer period of time.

5 Claims, 6 Drawing Sheets

VIDEO LIGHT APPARATUS TURNED-ON SELECTIVELY IN A STANDBY-MODE OF A VIDEO CAMERA

BACKGROUND OF THE INVENTION

1. Field of the Invention

The present invention relates generally to a video camera apparatus and, more particularly, is directed to a light apparatus for use with a video camera or a video tape recorder (VTR) having a built-in camera.

2. Description of the Background

Previously proposed video light apparatus for a video camera or a video tape recorder having a built-in type camera drive had an illumination lamp with a commercially-available AC voltage. The power requirement of such video light apparatus is high, for example, 150 to 300 W to provide high brightness lighting. Moreover, this video light apparatus has the disadvantage that it can only be used indoors.

Other previously proposed video light apparatus have overcome the above-described disadvantage using a power source providing a DC power of 50 W to 100 W. When the lamp of this video light apparatus is driven by DC voltage, the DC voltage is supplied from a battery pack in which many batteries are accommodated. This battery pack is heavy and the video light apparatus and the battery pack must be interconnected via a cord in order to power the video light apparatus. For this reason, it is proposed to drive a lamp of about 5 W to 29 W with a small battery. Japanese Patent Laid-Open Gazette No. 62-76974 describes such previously-proposed video light apparatus.

According to Japanese Patent Laid-Open Gazette No. 62-76974, a video light apparatus having incorporated therein small batteries is detachably attached to a video camera body. Further, this video light apparatus is provided with a switch for turning ON or OFF its lamp.

In this video camera apparatus in which the battery or dry cell is incorporated within the video light apparatus, the user must operate a switch that turns ON or OFF the lamp before taking a picture with the video camera. This operation of turning ON the lamp to take a picture is cumbersome to the user. Furthermore, various operations of the video camera are carried out after the video light apparatus is switched ON. Therefore, this previously proposed camera apparatus has the substantial disadvantage that the battery power is not efficiently consumed by the video camera.

OBJECTS AND SUMMARY OF THE INVENTION

Accordingly, it is an object of the present invention to provide an improved video camera apparatus which can avoid the aforenoted shortcomings and disadvantages encountered with the previously proposed video cameras.

More specifically, it is an object of the present invention to provide a video camera apparatus by which the user is free of the cumbersome operation of turning ON a power switch of a video light apparatus whenever the user takes a picture.

It is another object of the present invention to provide a video camera apparatus in which the power of a DC voltage source can be efficiently consumed.

It is a further object of the present invention to provide a video camera apparatus in which a video light apparatus can be operated for a longer period of time.

As a first aspect of the present invention, a video camera apparatus is provided, in which a video light apparatus is detachably attached to a video camera body. This video camera apparatus is characterized in that, when a standby switch of the video camera body is operated, a power switch of the video light apparatus is automatically controlled.

The above and other objects, features, and advantages of the present invention will be apparent in the following detailed description of illustrative embodiments of the invention to be read in conjunction with the accompanying drawings, in which like reference numerals are used to identify the same or similar parts in the several views.

DETAILED DESCRIPTION OF THE PREFERRED EMBODIMENTS

Figure 1:
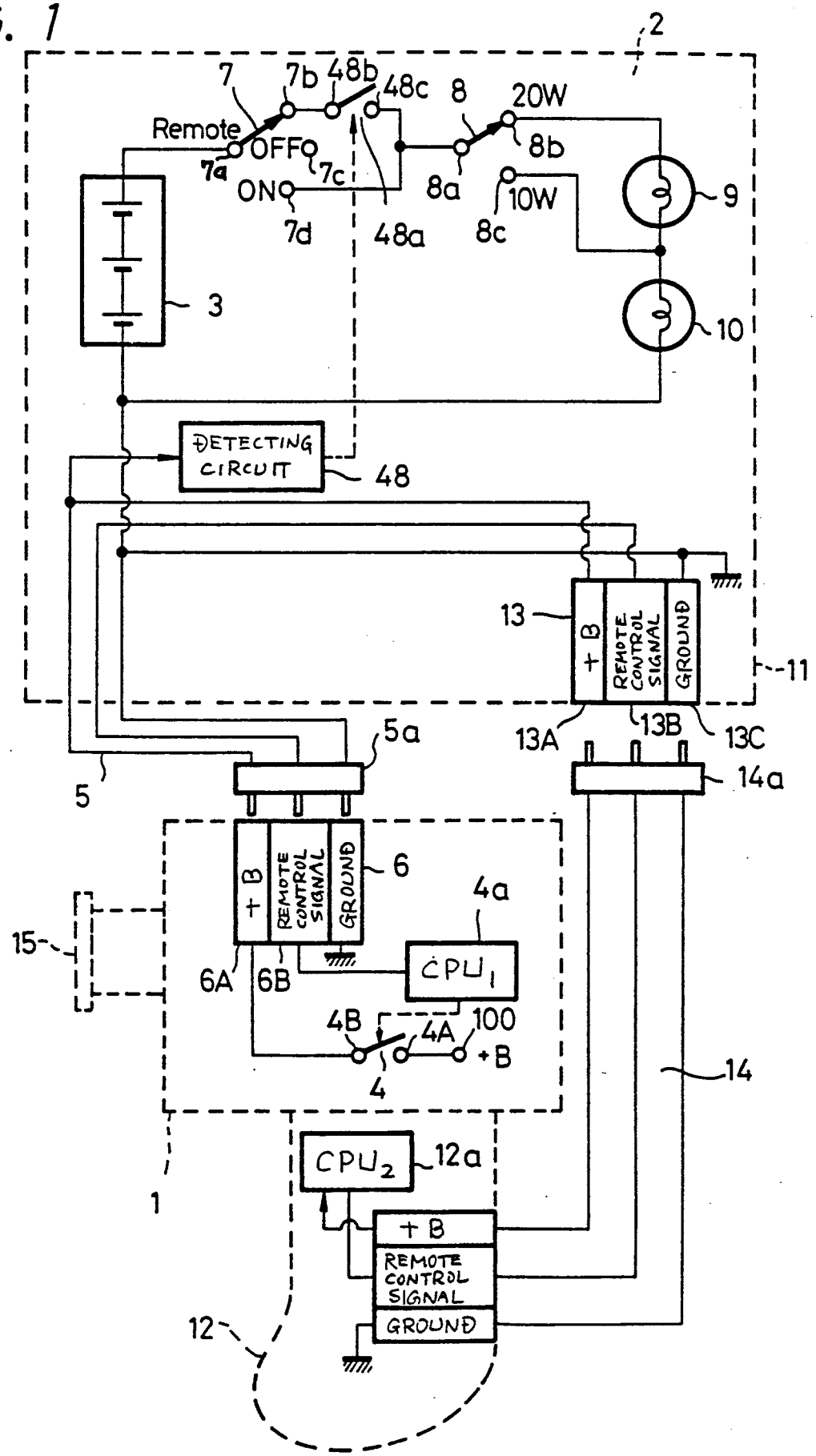
FIG. 1 is a schematic block diagram showing a first embodiment of the video camera apparatus according to the present invention.
Figure 2:
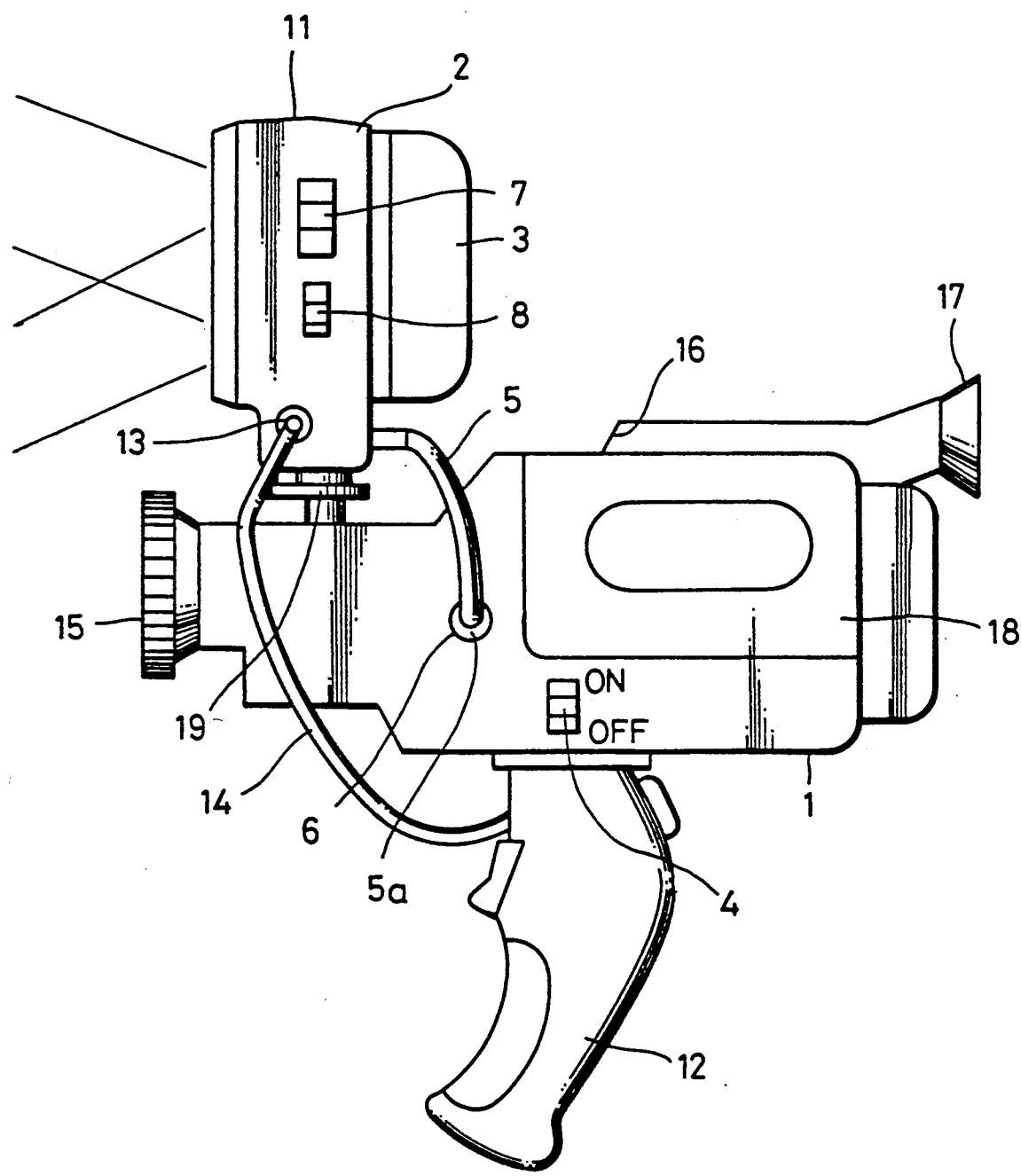
FIG. 2 is an elevational view illustrating an external appearance of the first embodiment of the video camera apparatus according to the present invention.

FIG. 1 shows a circuit arrangement of a first embodiment of the video camera apparatus according to the present invention, and FIG. 2 shows an external appearance of the video camera apparatus of this invention in which a video light apparatus is mounted on a video camera body.

FIG. 2 shows a video camera body 1 which is comprised of a lens 15, a viewfinder 16, an eyecup 17, and a video cassette tape compartment portion 18. A grip 12 is detachably attached to the bottom surface of the video camera body 1. On a side wall of the video camera body 1, a standby switch 4 is provided to place the video camera apparatus in a standby mode. The standby switch 4 powers the video camera apparatus and a remote control jack 6. Although the video camera body 1 includes various kinds of drive devices for setting the lens 15, for example, in a zoom-up mode, and various kinds of circuits, the drive devices are not shown in FIG. 1 for simplicity.

Referring to FIG. 1, one end 4A of the standby switch 4 is coupled to a terminal 100 to which a positive voltage +B is supplied by a voltage source (not shown). The other end 4B of the standby switch 4 is coupled to a voltage source terminal 6A of a remote control jack 6. A remote control signal terminal 6B of the remote control jack 6 is connected to a microcomputer 4a which is provided in the video camera body 1. This microcomputer 4a will hereinafter be referred to as a central processing unit ($CPU_1$) for simplicity. The $CPU_1$ 4a controls the ON or OFF operation of the standby switch 4.

When the grip 12 is not attached to the bottom surface of the video camera body 1 and the standby switch 4 is turned ON in a manual fashion, the voltage from the voltage source is supplied to respective circuits within the video camera body 1, whereby the video camera apparatus is set in various kinds of modes, for example, in a standby mode for picking up an image. If the user further depresses the standby switch 4, then the video camera apparatus is set to the shooting mode.

When the grip 12 is attached to the video camera body 1 and the user takes a picture with the video camera body 1 by using a remote control operation portion (not shown) of the grip 12, without the video light apparatus, the user inserts a plug 14a provided at a tip end of a lead 14 which is connected to the grip 12 into the remote control jack 6 of the video camera body 1. Then, the user can take a picture in a zoom-up mode, in a normal mode or the like by operating the remote control operation portion (not shown) of the grip 12. The grip 12 incorporates therein a second microcomputer also operating as a central processing unit 12a (hereinafter, simply referred to as a $CPU_2$) to control various operations of the video camera body 1 through a remote control signal.

The video camera apparatus is mainly comprised of the video camera body 1 and the grip 12 which effect various remote control operations as described above. Particularly, in this embodiment, this video camera apparatus is additionally provided with a video light apparatus 2.

This video light apparatus 2 is detachably mounted on top of the video camera body 1 as shown in FIG. 2. Referring to FIG. 2, the video light apparatus 2 is provided with a DC voltage source 3 formed of a rechargeable, secondary battery or the like which is detachably mounted on the rear surface of a housing 11 of the video light apparatus 2. This DC voltage source 3 will be described more fully below.

Referring back to FIG. 1, an anode of the DC voltage source 3 is connected to a movable contact 7a of a change-over switch 7 to switch the video camera apparatus between the remote control mode and the manual mode. Fixed contacts 7b and 7c of the change-over switch 7 are remote control contact and OFF contact, respectively, while fixed contact 7d is the manual-ON contact of the change-over switch 7. The fixed contact 7b of the change-over switch 7 is connected to a movable contact 48b of a switch 48a which switch is automatically turned ON and OFF in response to an output signal Sd from a detecting circuit 48. A fixed contact 48c of the switch 48a is connected to fixed contact 7d of switch 7 and to a movable contact 8a of a lamp change-over switch 8. A fixed contact 8b of the lamp change-over switch 8 is connected to a cathode of the DC voltage source 3 via a series circuit of first and second metal halide lamps 9 and 10. A fixed contact 8c of the lamp change-over switch 8 is connected to a junction between the first and second metal halide lamps 9 and 10, respectively.

The above-described change-over switches 7 and 8 are provided on the side wall of the housing 11 of the video light apparatus 2 as shown in FIG. 2. A jack 13 is also provided in the side wall of the housing 11. A lead wire 5 from the video light apparatus 2 has a plug 5a formed at the end thereof and extends from a side wall of the housing 11, which side wall is opposite to the side wall of the housing 11 in which switches 7, 8 and jack 13 are located. In this embodiment, a lead wire 14 from the grip 12 has a plug 14a formed at the end thereof and is coupled to jack 13 in the video light apparatus. Jack 13 is comprised of a voltage source terminal 13A, a remote control signal terminal 13B and a ground terminal 13C.

In the circuit arrangement shown in FIG. 1, voltage from the voltage terminals 6A or 13A is supplied to the detecting circuit 48, so that the +B voltage from the voltage source (not shown) can be detected by the detecting circuit 48. The switch 48a is automatically turned ON in response to an output signal Sd from the detecting circuit. When the grip 12 is not attached to the video camera body 1 or when the grip remote control operation is not carried out, plug 5a which is connected to the end of the lead wire 5 of the video light apparatus 2 is inserted into jack 6 of the video camera body 1. In this state, if movable contact 7a of the change-over switch 7 is connected to remote control fixed contact 7b and movable contact 8a of the lamp change-over switch 8 is connected to fixed contact 8b and the standby switch 4 of the video camera body 1 is manually operated, the voltage of the internal camera voltage source (not shown) is supplied through the voltage source terminal 6A of the jack 6 and the lead wire 5 to the detecting circuit 48 within the video light apparatus 2, whereby the detecting circuit 48 detects the existence of the voltage. If the detecting circuit 48 detects the existence of the voltage source voltage +B, the detecting circuit 48 causes the switch 48a to be turned ON and movable contact 8a to be connected to fixed contact 8b, whereby the first and second metal halide lamps 9 and 10 are turned ON simultaneously.

If the movable contact 8a of the lamp change-over switch 8 is connected to the fixed contact 8c, then only the second metal halide lamp 10 is turned ON when the detecting circuit 48 detects the +B voltage, thus, it is possible to control the brightness of the light produced by the video light apparatus 2.

If the video light apparatus 2 is detached from the video camera body 1 to be used as a conventional flashlight and the change over switch 7 is turned ON for manual mode, the movable contact 7a of the change-over switch 7 is connected to the fixed contact 7d. Therefore, metal halide lamps 9 and 10 can be turned ON and OFF in a manual fashion.

When the grip 12 is attached to the video camera body 1 to perform the grip remote control operation, a plug 14a which is connected to the end of the lead wire 14, which lead wire extends from grip 12, must be inserted into the jack 13 of the video light apparatus 2 and the plug 5a which is connected to the end of the lead wire 5, which lead wire extends from the video light apparatus 2, must be inserted into jack 6 on the video camera body Further, under this condition, if the video camera body 1 is placed in standby mode by the remote control operation portion (not shown) of the grip 12, then the remote control signal from the grip 12 is supplied over the signal path, which consists of the lead wire 14, the plug 14a, the jack 13, the lead wire 5, the plug 5a, the jack 6, to the CPU₁ 4a. CPU₁ 4a then turns ON the standby switch 4 of the video camera body 1. The positive voltage source voltage +B is supplied to the video light apparatus over a conductive path consisting of the voltage source terminal 100, the standby switch 4, the voltage source terminal 6A of the jack 6, the plug 5a, and the lead wire 5, to the detecting circuit 48, so that the detecting circuit 48 detects the voltage source voltage and turns the switch 48a ON. Furthermore, various other operations within the video camera body 1 can be controlled by the grip 12 through the grip remote control operation.

Figure 3:
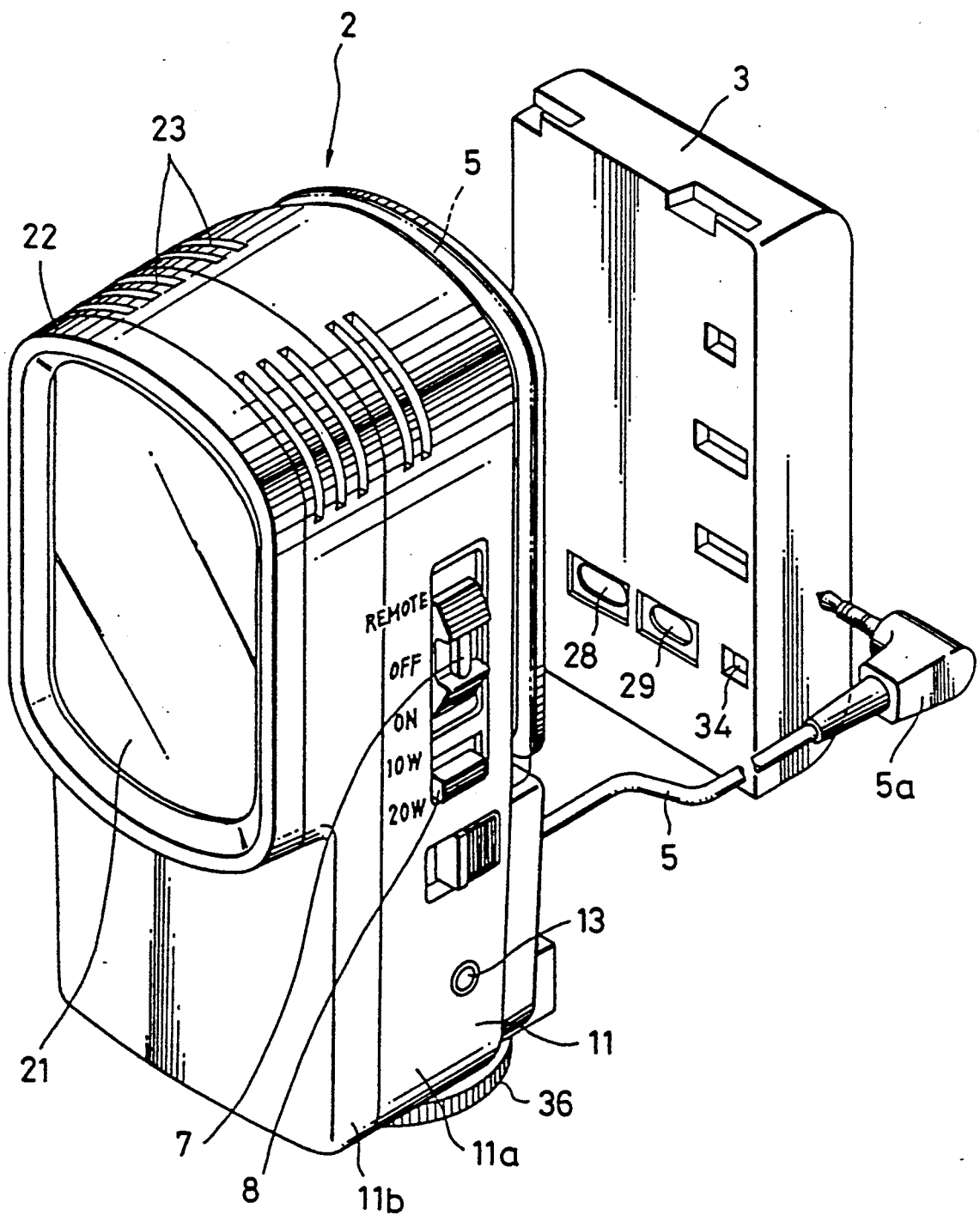
FIG. 3 is a front perspective view illustrating a first embodiment of a video light apparatus used in the video camera apparatus of the present invention.
Figure 4:
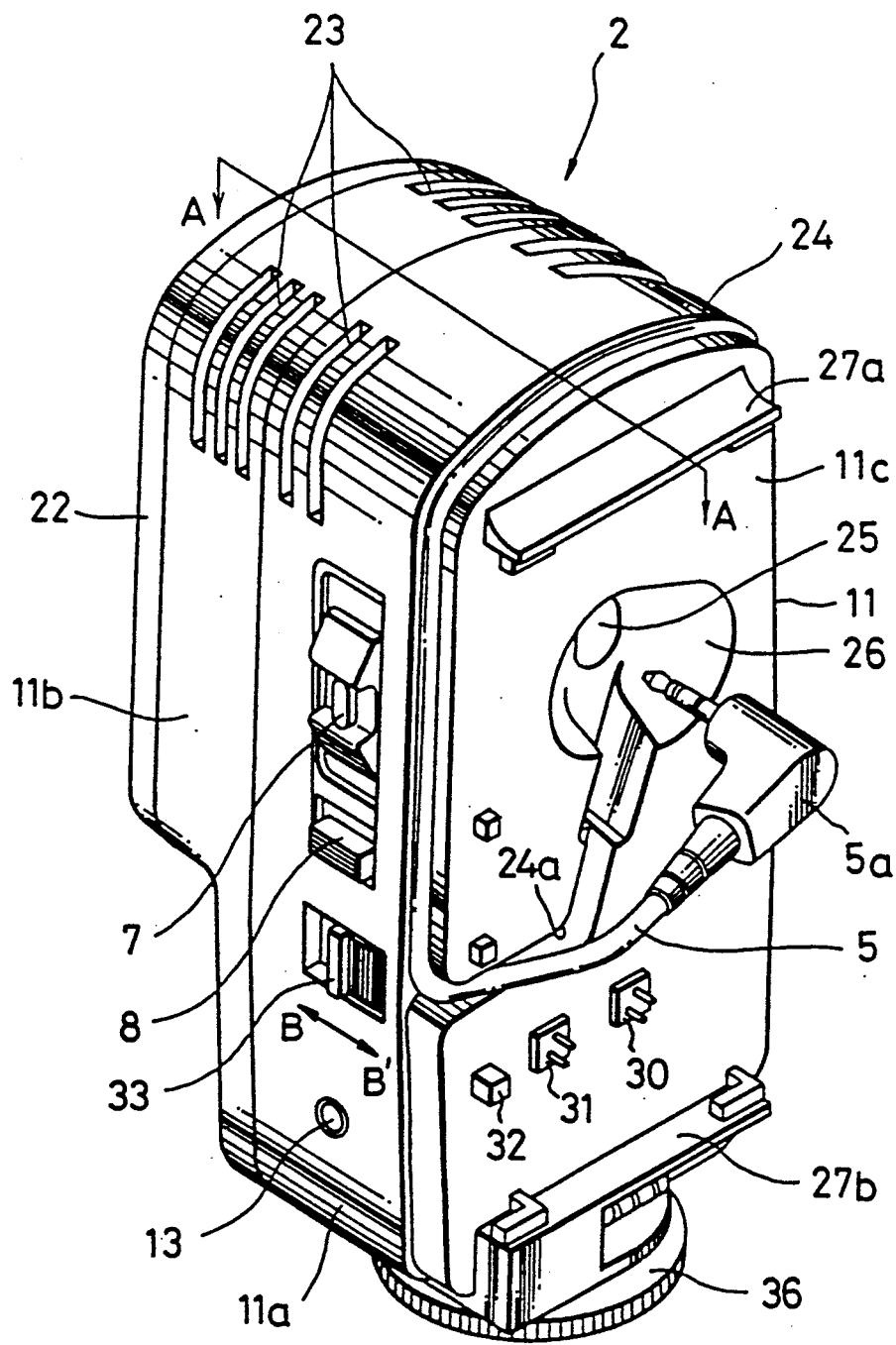
FIG. 4 is a rear perspective view illustrating the first embodiment of the video light apparatus used in the video camera apparatus of the present invention.
Figure 5A:
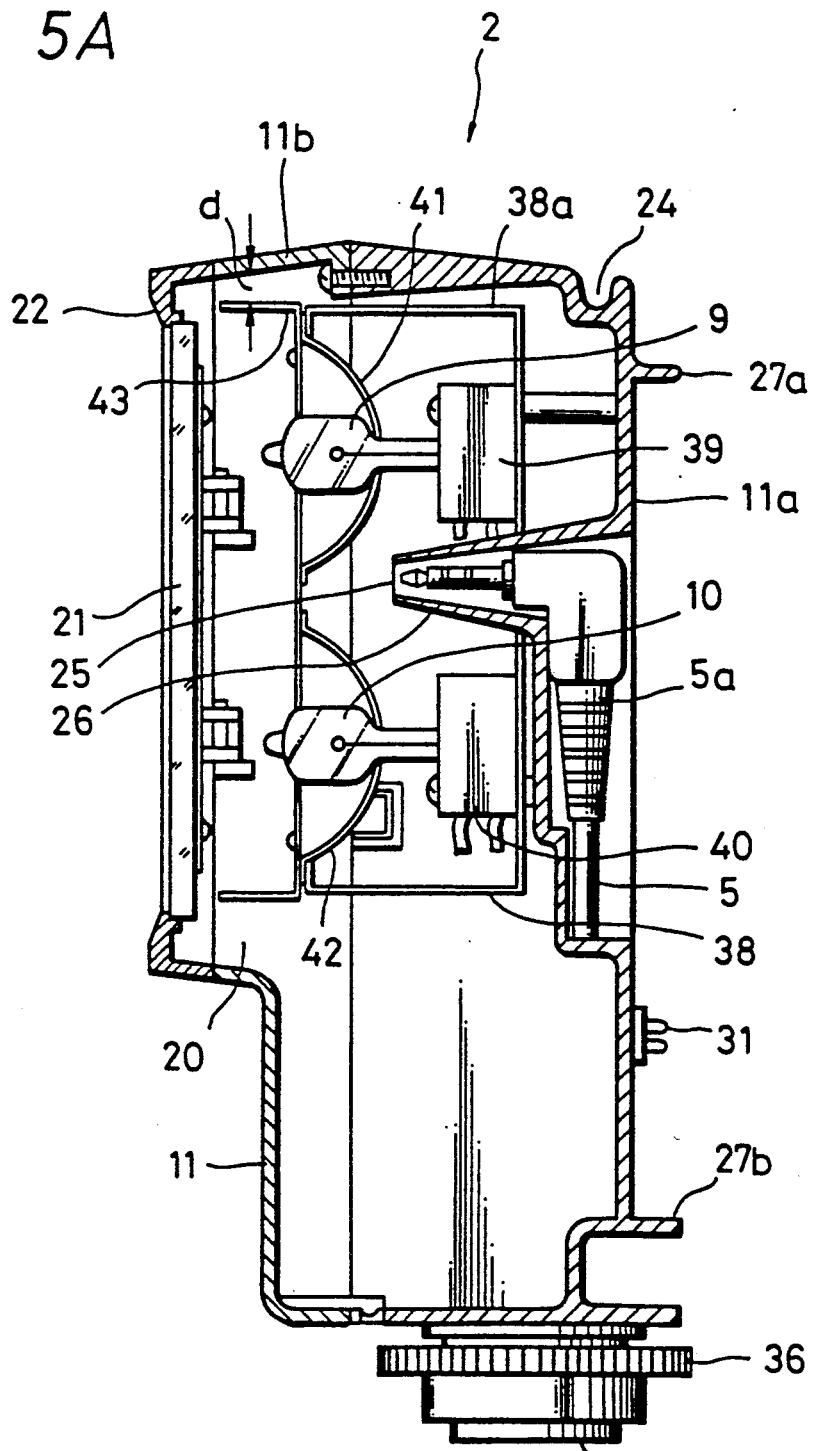
FIG. 5A is an elevational view in cross section taken through section line A—A in FIG. 4.
Figure 5B:
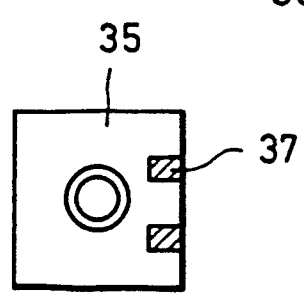
FIG. 5B is a bottom view illustrating a slide plug and control terminals of the video light apparatus shown in FIG. 5A.

The video light apparatus 2 will be described in more detail with reference to FIGS. 3 to 5, wherein FIG. 3 is a front perspective view of the video light apparatus 2, FIG. 4 is a rear perspective view of the video light apparatus 2, FIG. 5A is a side view of a section taken along the section line A—A in FIG. 4, and FIG. 5B is a bottom view of a slide plug thereof.

Referring to FIGS. 3 to 5, housing 11 of the video light apparatus 2 is formed of a synthetic resin or the like and is shaped as a rectangular box. The housing 11 is comprised of a housing body 11a and a removable front panel 11b. Underneath the front panel 11b is a generally open space 20, as shown in FIG. 5A. A frame 22 having a frosted glass 21 is engaged with the front panel 11b and is detachably secured to the front panel 11b so as to cover the open portion 20. Light is irradiated on the object (not shown) from the metal halide lamps 9 and 10 through the frosted glass 21 of frame 22.

Heat radiation slots 23 are formed through the upper portions of the housing body 11a and the front panel 11b so as to radiate the heat generated from the metal halide lamps 9 and 10. On the right side wall of the housing body 11a, the change-over switch 7, the lamp change-over switch 8 and the jack 13, respectively, are provided as shown in FIG. 3. If the change-over switch 7 is moved to the remote control position, the metal halide lamps 9 and 10 are automatically turned ON and OFF in relation to the standby operation of the video camera body 1. The metal halide lamps 9 and 10 may also be turned ON and OFF in a manual fashion. Further, if the lamp change-over switch 8 is moved to the position of 10 W, only the metal halide lamp 10 will be lit, while if the switch 8 is moved to the position of 20 W, both the metal halide lamps 9 and 10 will be lit at the same time.

The jack 13 is supplied with the remote control signal from the grip 12 of the video camera body 1 through lead wire 14 and plug 14a. In this implementation, the lead wire 5 connected to the plug 5a is led out from the left side wall of the housing body 11a. The lead wire 5 is inserted into a guide slot 24 formed on the rear side surface of the housing body 11a such that the lead wire 5 is laid along the guide slot 24 so as to substantially encircle half of the left side surface, the upper surface, and the right side surface of the housing body 11a. Further, the lead wire 5 is inserted into a continuation portion 24a of guide slot 24 (see FIG. 4) formed on the rear surface 11c of housing body 11a. Thus, the lead wire 5 can be neatly stored.

Further, on the rear surface 11c of the housing body 11a, a pair of supporting members 27a and 27b are provided at upper and lower ends thereof and perpendicularly across the rear surface 11c to detachably hold therebetween the DC power source 3, formed as a rechargeable secondary battery. Furthermore, on the rear surface 11c of the housing body 11a, contact pins 30 and 31 are provided to make electrical connection with the cathode and anode 28 and 29 see FIG. 3) of the DC power source 3.

A locating member 32, as shown in FIG. 4, is provided on the rear surface 11c of the housing body 11a to locate correctly the DC power source relative to the rear surface 11a. A slidable lever 33 is provided at the side wall of the housing body 11a, so that the slidable lever is moved in the direction shown by the arrow in FIG. 4, the locating member 32 is moved towards housing body 11a as shown in FIG. 4 such that the end of the locating member 32 is flush with the rear surface 11c of the housing body 11a. In this state, if the DC power source 3 shown in FIG. 3 is engaged between the supporting members 27a and 27b and the slidable lever 33 is moved in the direction towards the frame 22 in FIG. 4, the locating member 32 protrudes from housing 11c as shown in FIG. 4 and is engaged with a recess 34 formed in the front surface of the DC power source 13 shown in FIG. 3, whereby the DC power source 3 is held stably to the housing body 11a.

A slide plug 35 is formed on the bottom surface of the housing body 11a of the video light apparatus 2, as shown in FIG. 5A. This slide plug 35 is inserted into a camera shoe 19, that is hot, and is provided on the front upper portion of the camera body 1, as shown in FIG. 2. As shown in FIG. 5B, this slide plug 35 is provided with a control terminal 37 by which the video light apparatus 2 is electrically connected with the video camera body 1. The detected signal and the control signal may be connected through this control terminal 37. This camera shoe 19 is tightly fastened to the video camera body 1 by rotating a knob 36 attached to the bottom portion of the video light apparatus 2.

Within the video light apparatus 2, a chassis 38 that is substantially U-shaped in cross-section is secured to the rear surface of the housing body 11a as shown in FIG. 5A. Sockets 39 and 40 are provided on the chassis 38 and the metal halide lamps 9 and 10 are inserted into these sockets 39 and 40, respectively. The plug supporting portion 26 is shaped as a cone and is formed on the rear surface of the housing body 11a The plug supporting portion 26 is projected into the chassis 38 through an opening 25 bored through the chassis 38. Light reflecting plates 41, 42 having a hemispherical shape are formed in the chassis 38. A heat radiating plate 43 is provided on the front surface of the chassis 38 with a predetermined spacing d between the heat radiating plate 43 and both the housing body 11a and the upper surface of the front lid 11b, whereby the housing body 11a and the front lid 11b which are made of synthetic resin are prevented from being directly heated by heat which is generated from the metal halide lamps 9 and 10. The heat is prevented from reaching the synthetic resin by both the heat radiating plate 43 and an upper surface portion 38a of the chassis 38.

In the video camera apparatus of the present invention, when the video camera body 1 or the grip 12 is set in the standby mode, the metal halide lamps 9 and 10 are automatically turned ON. Therefore, making the video camera apparatus easier to operate.

Figure 6:
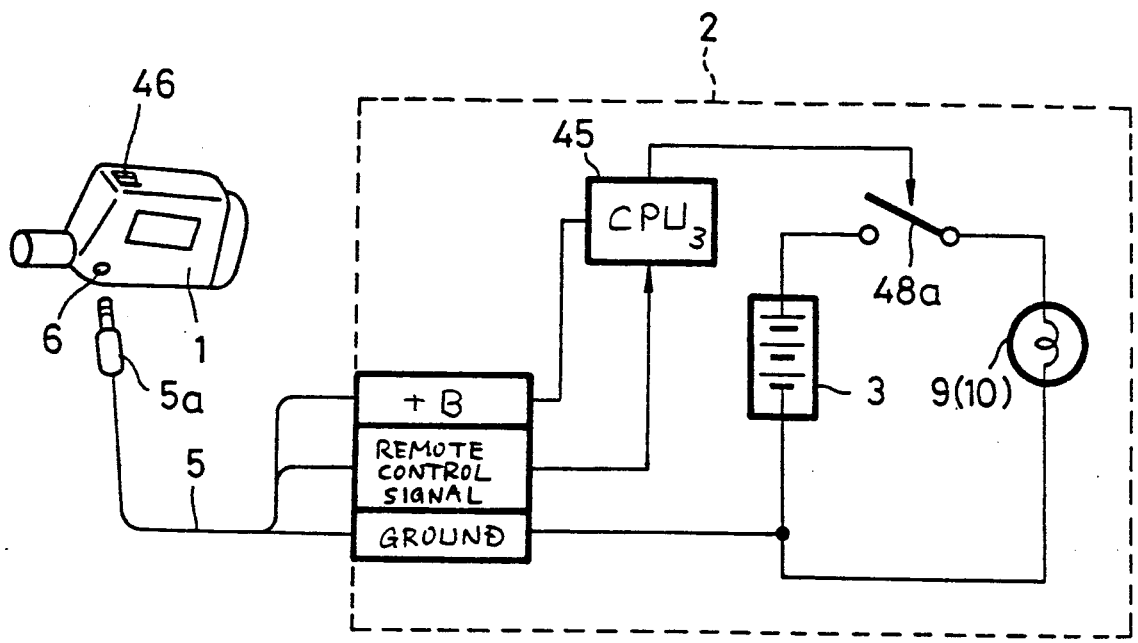
FIG. 6 is a schematic diagram showing a second embodiment of the video camera apparatus according to the present invention.

FIG. 6 is a schematic diagram showing another embodiment of the present invention. In this embodiment, while the voltage from the voltage source of the video camera body 1 is detected by the detecting circuit 48 thereby to control the change-over switch 48a as shown in FIG. 1, another variation is also possible as shown in FIG. 6. More specifically, as shown in FIG. 6, a third microcomputer (hereinafter, referred to as a CPU3) operating as a central processing unit 45 is provided within the video light apparatus 2 and the CPU3 45 is supplied with the remote control signal and the voltage from the voltage source, from the remote control jack 6 or a hot shoe 46 on the video camera body 1. In this embodiment, the switch 48a is turned ON and OFF by a control signal from the CPU3 45 provided within the video light apparatus 2.

Figure 7:
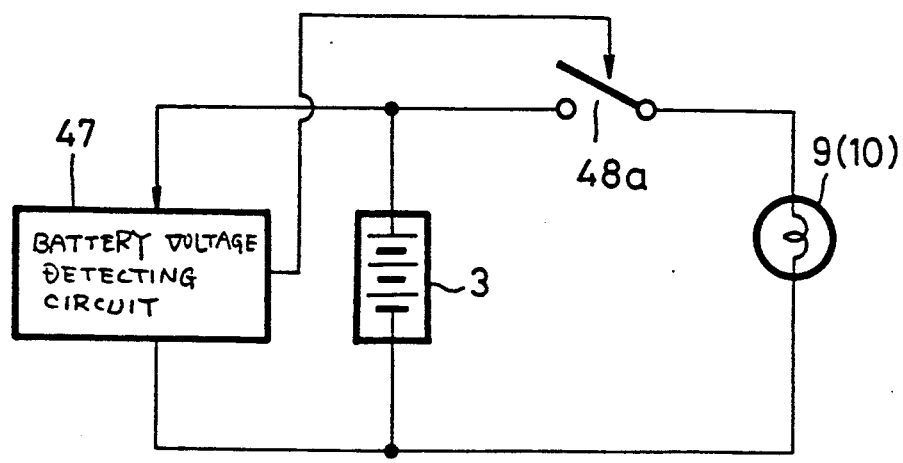
FIG. 7 is a schematic diagram showing an example of a DC voltage source protecting circuit used in the video camera apparatus of the present invention.

FIG. 7 shows a DC voltage source protecting circuit. As shown in FIG. 7, a battery voltage detecting circuit 47 is provided within the video light apparatus 2 in order to remove a so-called memory effect in which the storage capacity is lowered by a repetitive small charge or discharge of the DC voltage source 3 formed of the secondary battery. That is, when the voltage across the DC voltage source 3 becomes about 5 V, the battery voltage detecting circuit 47 detects the above-described voltage and automatically turns OFF the metal halide lamps 9 and 10.

In the video camera apparatus of the present invention, since the metal halide lamps 9 and 10, which are provided within the video light apparatus 2, are automatically turned ON or OFF by operating the standby switch 4 of the video camera body 1, the user is free from the cumbersome and time consuming operation of constantly turning ON the power switch when the user takes a picture and turning the power switch OFF when the camera is not in use. Further, since the metal halide lamps 9 and 10 need not be turned ON before the video camera apparatus is set in the standby mode, it is possible to prevent the power of the DC voltage source 3 from being inefficiently consumed.

Having described preferred embodiments of the invention with reference to the accompanying drawings, it is to be understood that the invention is not limited to those precise embodiments of the invention and that many changes and modifications thereof could be effected by one skilled in the art without departing from the spirit or scope of the novel concepts of the invention as defined in the appended claims.

We claim as our invention:

1. A video camera apparatus comprising:
   a video camera body;
   a video light apparatus which is detachably connected to said camera body;
   a standby switch arranged in said video camera body for setting a standby mode of said video camera;
   a remote control unit which is detachably connected to said video camera body for producing a remote control standby signal;
   standby switch control means responsive to said remote control standby signal for actuating said standby switch;
   a standby mode detection circuit responsive to said standby switch for detecting said standby mode of said video camera; and
   power switching means arranged in said video light apparatus for controlling energization of said video light apparatus in response to said standby detection circuit detecting said standby switch being set in said standby mode.

2. The video camera apparatus according to claim 1, wherein said video light apparatus includes light switching means for selectively switching output brightness of said video light apparatus when said video light apparatus is switched ON.

3. The video camera apparatus according to claim 1, wherein said video light apparatus includes a housing having DC voltage source attaching means formed on one side surface thereof for attaching a DC voltage source to said video light apparatus.

4. The video camera apparatus according to claim 3 wherein said video light apparatus, further comprises a connection cord accommodating portion formed on said one side surface of said housing in which said DC voltage source attaching means is provided for accommodating said connection cord.

5. A video camera apparatus comprising:
   a video camera body;
   a video light apparatus which is detachably connected to said camera body;
   a standby switch arranged in said video camera body for setting a standby mode of said video camera;
   power switching means arranged in said video light apparatus for controlling said video light apparatus in response to said standby switch being set in said standby mode; and
   DC voltage source detecting means for detecting a DC voltage discharge provided by said video camera body and for switching OFF said power switching means in response to detecting said DC voltage.

* * * * *